United States Patent
Maalouf et al.

(10) Patent No.: US 10,995,630 B2
(45) Date of Patent: *May 4, 2021

(54) REVERSE ROTATION DETECTION IN ROTATING MACHINERY

(71) Applicant: Baker Hughes, a GE Company, LLC, Houston, TX (US)

(72) Inventors: Mel Gabriel Maalouf, Minden, NV (US); Munir Ahmed Qureshi, Alkhobar (SA)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/662,605

(22) Filed: Oct. 24, 2019

(65) Prior Publication Data
US 2020/0056502 A1    Feb. 20, 2020

Related U.S. Application Data

(63) Continuation of application No. 14/483,977, filed on Sep. 11, 2014, now Pat. No. 10,465,551.

(51) Int. Cl.
*G01H 1/00*    (2006.01)
*G01P 13/04*    (2006.01)
(Continued)

(52) U.S. Cl.
CPC ........... *F01D 21/003* (2013.01); *F01K 13/02* (2013.01); *G01H 1/003* (2013.01); *G01H 1/006* (2013.01);
(Continued)

(58) Field of Classification Search
CPC .......... G01H 1/003; G01H 1/006; G05B 2219/42321; G05B 23/0235; F02D 2250/06; G01P 13/04
See application file for complete search history.

(56) References Cited

U.S. PATENT DOCUMENTS 4,186,597 A    2/1980    Brown
5,825,150 A    10/1998    Kachi et al.
(Continued)

FOREIGN PATENT DOCUMENTS

JP    2002317791 A    10/2002
JP    2006141112 A    6/2006
WO    2006068931 A2    6/2006

OTHER PUBLICATIONS

Extended European Search Report in Application No. 15184342.2, dated Mar. 8, 2016.
(Continued)

*Primary Examiner* — Herbert K Roberts
(74) *Attorney, Agent, or Firm* — Mintz Levin Cohn Ferris Glovsky and Popeo, PC; Lisa Adams

(57) ABSTRACT

A system includes a sensor configured to monitor rotating machinery and generate a signal based on a physical characteristic of the rotating machinery. The system also includes a monitoring system with a processor. The processor of the monitoring system is configured to receive the signal from the sensor. The processor determines an occurrence of reverse rotation of the rotating machinery by comparing the signal to a normal operating pattern to generate an initial value. The processor generates a notification signal indicating the occurrence of a reverse rotation.

22 Claims, 4 Drawing Sheets

(51) Int. Cl.
*F01D 21/00* (2006.01)
*G05B 9/02* (2006.01)
*F01K 13/02* (2006.01)
*F02D 41/22* (2006.01)
*G05B 23/02* (2006.01)

(52) U.S. Cl.
CPC ............ *G05B 9/02* (2013.01); *F02D 2250/06* (2013.01); *G01P 13/04* (2013.01); *G05B 23/0235* (2013.01); *G05B 2219/42321* (2013.01)

(56) References Cited

U.S. PATENT DOCUMENTS

| | | | |
|---|---|---|---|
| 6,171,064 | B1 | 1/2001 | Hugenroth et al. |
| 6,210,119 | B1 | 4/2001 | Lifson et al. |
| 2004/0189282 | A1 | 9/2004 | Schmid et al. |
| 2012/0330606 | A1 | 12/2012 | Whitefield |
| 2014/0100763 | A1 | 4/2014 | Fujiwara |

OTHER PUBLICATIONS

Gad A, "Reverse Rotation in Centrifugal Compressors", 40th Turbomachinery Symposium, pp. 501-519, Sep. 12-15, 2011.
Mel G. Maalouf, et al.; "Slow Speed Vibration Signal Analysis: If You Can't Do It Slow, You Can't Do It Fast"; Proceedings of GT2007; ASME Turbo Expo2007: Power for Land, Sea and Air; May 14-17, 2007, Montreal, Canada.

REVERSE ROTATION DETECTION IN ROTATING MACHINERY

CROSS REFERENCE TO RELATED APPLICATIONS

This application is a continuation of U.S. patent application Ser. No. 14/483,977 filed Sep. 11, 2014, entitled "REVERSE ROTATION DETECTION IN ROTATING MACHINERY," which is hereby incorporated herein by reference in its entirety.

BACKGROUND

The invention relates generally to monitoring systems, and, more particularly, to an automated system for detecting reverse rotation on an industrial system using turbo machinery.

Generally, turbo machines, such as turbines, compressors and pumps, are designed to transfer energy between a rotor and a fluid. While turbines transfer energy from a fluid to a rotor, compressors and pumps transfer energy from a rotor to a fluid. Many turbo machines are designed for processing such fluids in a unique direction (clockwise or counterclockwise). As such, the machines are not designed to withstand rotation opposite the designed direction. However, operation process parameters or malfunctioning valves can result in backward pressure occurring. This backward pressure can cause turbo machines to rotate in the reverse direction of a machine's design. As a result, the driven piece of equipment can become the driver. Reverse rotation can affect the integrity of the machine ultimately causing stress and/or damage, if left unchecked. For instance, extreme torque in the reverse direction can cause coupling and rotor problems. Additionally, reverse rotation can damage bearings, seals, and other components that may only be designed to operate in the forward direction.

Presently, many problems may be encountered in trying to monitor rotor reverse rotation events in turbo machinery. Under certain conditions, the machine may rotate in the reverse direction unnoticed. For instance, incorrect operation of downstream discharge, shutoff, and check valves during shutdown events often goes unnoticed. Moreover, reverse rotation may also not be limited to just one machine, but can be a widespread issue with sister machines of similar applications at a plant. Accordingly, there is a need for a monitoring system for reverse rotation of the rotor in turbo machinery.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a device includes a communication interface configured to receive a signal related to a rotational speed, a vibration, or any combination thereof of a rotating machine element, a memory for storing an operating pattern of the rotating machine element, wherein the operating pattern is related to the received signal, and a processor coupled to the communication interface and the memory, wherein the processor is configured to determine an occurrence of reverse rotation of the rotating machine element by comparing the signal received from the communication interface to the operating pattern stored in the memory, and generate an initial value indicative of the occurrence of the reverse rotation of the rotating machine element.

In a second embodiment, a system includes a sensor configured to monitor rotating machinery and generate a signal based on a physical characteristic of the rotating machinery, and a monitoring system comprising a processor configured to receive the signal of the rotating machine element, determine an occurrence of reverse rotation of the rotating machinery by comparing the signal to an operating pattern to generate an initial value; and generate a notification signal indicating the occurrence of a reverse rotation.

In a third embodiment, a non-transitory computer-readable medium having computer executable code stored thereon, the code comprising instructions to receive a signal from a sensor associated with rotating machinery, determine an occurrence of reverse rotation of the rotating machinery based on the signal and an operating pattern of the rotating machinery, and generate a notification signal indicating the occurrence of reverse rotation of the rotating machinery.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
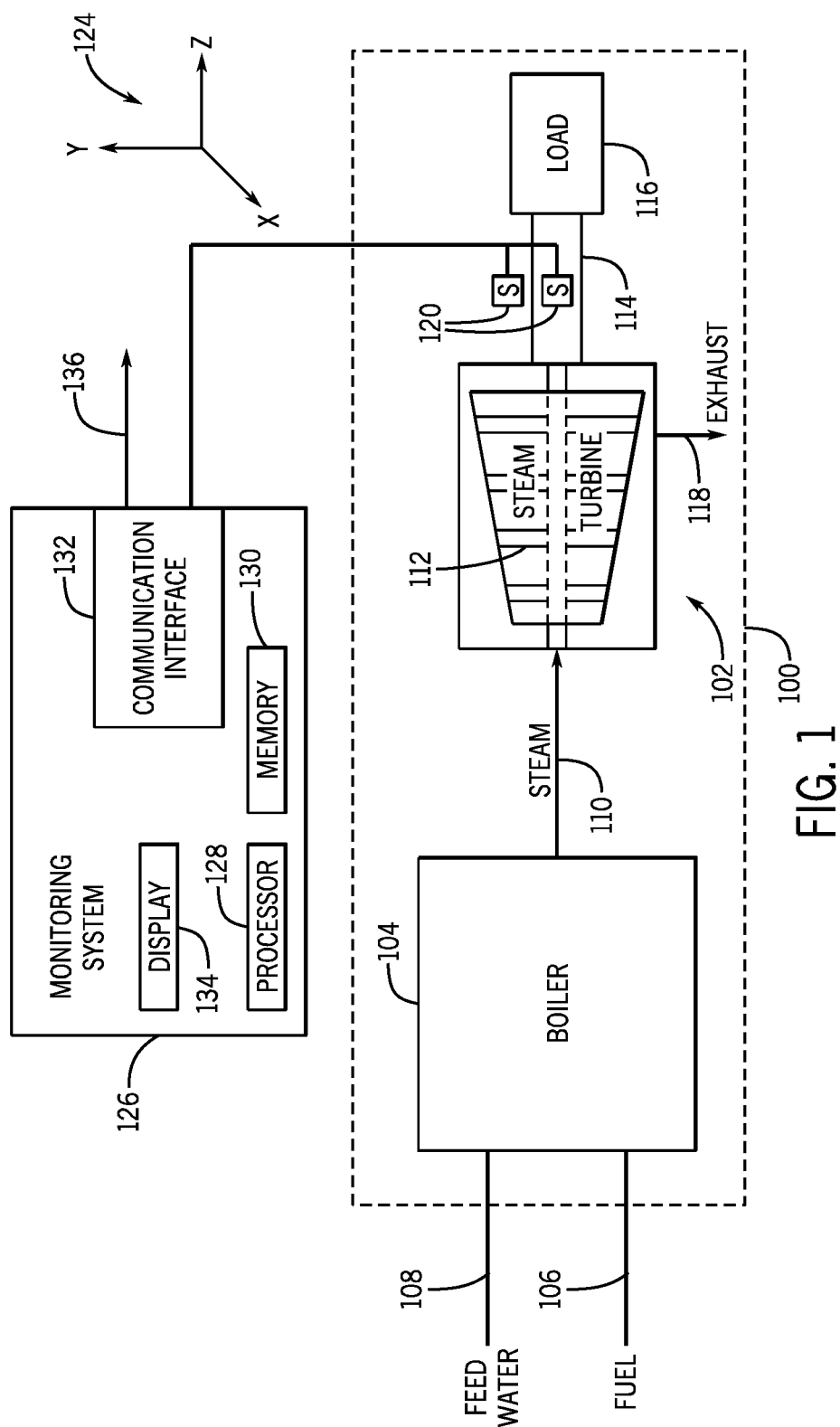
FIG. 1 is a schematic flow diagram of an exemplary steam turbine system in accordance with the present techniques.

With the foregoing in mind, FIG. 1 illustrates an exemplary system for monitoring reverse rotation of a steam turbine system 100. As will be appreciated, the steam turbine system 100 is merely an example, and the present embodiments may be used in any type of pump, compressor, turbine, or similar structure which may benefit from a reverse rotation monitoring system. More specifically, the distinguishing feature of the present embodiment is the fact that a driven piece of equipment becomes the driver. In the steam turbine system 100, a steam turbine 102 transfers thermal energy from pressurized steam into mechanical energy. A boiler 104 heats up feed water 108 by combusting fuel 106 to produce steam 110. The highly pressurized steam 110 rotates a rotor 112, losing pressure in the process. The rotor 112 is operatively coupled to a shaft 114, such that when the rotor 112 turns, it turns the shaft 114. The shaft 114 then turns to deliver energy to a load 116. In this manner, one or both of the rotor 112 and the shaft 114 are examples of rotating machine elements and/or rotating machinery of the turbine system 100. The lower pressure steam may be reheated, put through an intermediate or low pressure turbine, or may be output as exhaust 118 to be used with other downstream industrial processes.

The shaft 114 is equipped with sensors (e.g., probes) 120. One embodiment may comprise two sensors: a first sensor 120 placed along the shaft 114 at ninety degrees apart from a second sensor 120. As reflected in the three dimensional coordinate system 124, the first sensor 120 may be placed on the Y axis of the shaft 114 (e.g. along a top most portion of the shaft 114), and the second sensor 120 may be placed on the X axis of the shaft 114 (e.g. along a side portion of the shaft 114). Thus, the second sensor 120 is mounted 90 degrees clockwise from the first sensor 120. However, any variety of positioning for any variety of number of sensors may be used to best provide data about the steam turbine 102, or similar turbo machinery. In some embodiments, a notch may be drilled in the shaft 114 to track each revolution of the shaft 114. The sensors 120 transmit signals to a monitoring system 126 using any suitable communication method (e.g. hard wired or wireless communication).

In certain embodiments, the sensors 120 may be any of various sensors useful in providing various operational data to the reverse rotation monitoring system 126 including, for example, speed and vibration data. This data may be used not just for reverse rotation detection, but may be used for a wide variety of purposes. The monitoring system 126 may be comprised of a processor 128 or multiple processors, memory 130, and a communication interface 132. The processor 128 may be operatively coupled to the memory 130 to execute instructions for carrying out the presently disclosed techniques. These instructions may be encoded in programs or code stored in a tangible non-transitory computer-readable medium, such as the memory 130 and/or other storage. The processor 128 may be a general purpose processor, system-on-chip (SoC) device, or application-specific integrated circuit, or some other processor configuration.

Memory 130, in the embodiment, includes a computer readable medium, such as, without limitation, a hard disk drive, a solid state drive, a diskette, a flash drive, a compact disc, a digital video disc, random access memory (RAM), and/or any suitable storage device that enables processor 128 to store, retrieve, and/or execute instructions and/or data. Memory 130 may include one or more local and/or remote storage devices.

The monitoring system 126 may have a wide variety of inputs and outputs in the communication interface 132. The communication interface 132 may include, without limitation, a network interface controller (NIC), a network adapter, a transceiver, and/or any suitable communication device that enables the monitoring system 126 to operate as described herein. The communication interface 132 may connect to a network, to a remote computer system (neither shown), or a database using any suitable communication protocol, such as, for example, a wired Ethernet protocol or a wireless Ethernet protocol. The communication interface 132 may receive signals indicating that the turbine 112 is shutting down, turning on, speeding up, or slowing down. The communication interface 132 may receive signals from the sensors regarding, for example, speed and vibration data. The monitoring system 126 may also include an internal display 134 for displaying data received by the communication interface 132 or any analysis performed by the processor 128. The internal display 134 may display plots, graphs or charts similar to those described in FIG. 2A-C or FIG. 3A-B. Alternatively, the information could be sent to an external display, locally or remotely, to display similar information.

In certain embodiments, the monitoring system 126 may be programmed or configurable (e.g., performed via the processor 128 and the memory 130) to support comparisons of speed and vibration data to normal operating patterns. The monitoring system may receive speed and vibration signals from the sensors 120. In one embodiment, the monitoring system 126 is configured to receive an indication that the turbine 112 is shutting down. This indication may be received from the sensors 120, from a server, from the steam turbine system 100, or by some other means. Alternatively, the monitoring system 126 may determine that the steam turbine 102 is shutting down based on speed and vibration data of the shaft 114 received from the sensors 120. The monitoring system 126 then determines whether a reverse rotation event will occur, is in the process of occurring, or has already occurred by comparing data received from the sensors 120 to normal operating patterns. The monitoring system 126 may compare the received data to normal operating patterns internally with signal processing. As discussed below, the comparisons of received data against normal operating patterns may include weights (e.g., weighting factors) assigned to different aspects of the speed and vibration data provided by the sensors 120. The normal operating patterns may be predetermined according to the steam turbine system 100, user-adjustable, or based on prior shutdown data. Similarly, preset weights may be based on predetermined values, user-adjustable, or based on prior shutdown data. The preset weights and/or normal operating patterns may be stored in the memory 130 or be in hardware of the monitoring system 126. The comparison steps or processes may, for example, be written in code and stored in the memory 130 to be executed by the processor 128 using, for instance, signal processing.

In certain embodiments, the monitoring system 126 may provide indications of whether or not a reverse rotation has occurred based on, for example, comparing the received values from sensors 120 to normal operating patterns. Specifically, the monitoring system 126 may be programmed or conditioned to generate a signal 136, or a number of signals, when one or more comparisons suggest that a reverse rotation event has occurred. The signal 136 may be sent to a workstation that includes a display to show the data in charts, plots, graphs, tables, or similar structure. Alternatively, the signal 136 may be sent as an alert of a reverse rotation event to a workstation, a remote server, or a database. In addition to the alert signal 136 being sent, data indicative of the alarm can also be sent to the workstation, remote server, or database as further evidence that reverse rotation occurred. As will be appreciated, an alert and data related thereto are merely examples of signals sent by the monitoring system 126 and the signal 136 sent could be any indication that a reverse rotation event has occurred. Additionally and/or alternatively the signals may be sent to an internal display 134 to display alerts or show the data as charts, plots, graphs tables, or similar structure. The data may be shown in a variety of forms to convey evidence that a reverse rotation has occurred. For instance, speed trend plots, orbit plots, or waterfall plots may be used to describe the reverse rotation event.

Figure 2A:
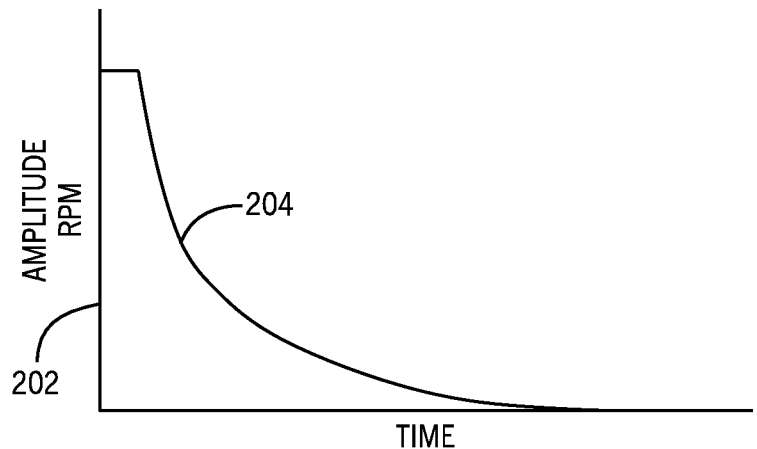
FIG. 2A is a graph illustrating an embodiment of the data received by the monitor system of FIG. 1 during a normal shutdown operation.
Figure 2B:
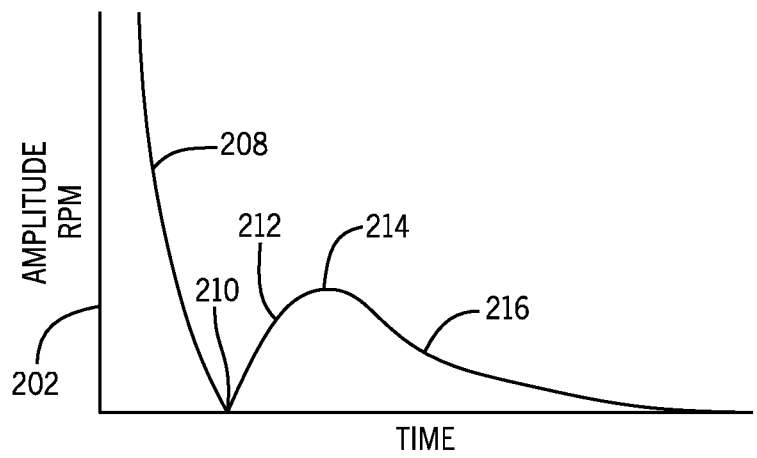
FIG. 2B is a graph illustrating an embodiment of the data received by the monitor system of FIG. 1 during a reverse rotation event.
Figure 2C:
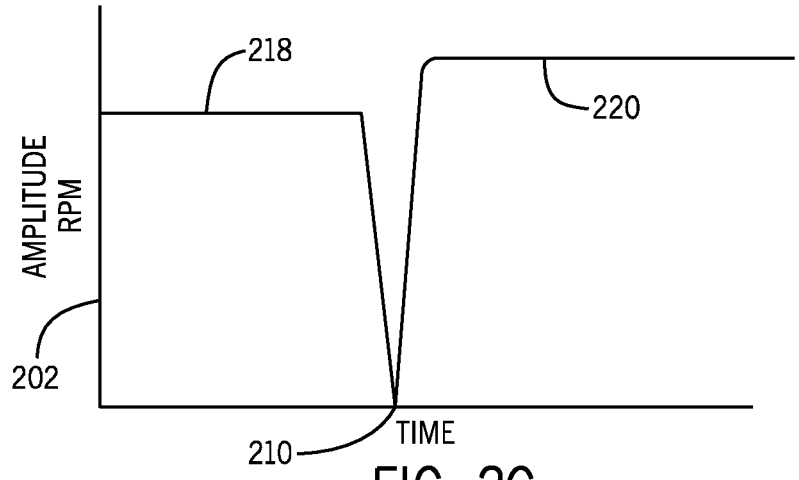
FIG. 2C is a graph illustrating an embodiment of the data received by the monitor system of FIG. 1 during a reverse rotation event.
Figure 3A:
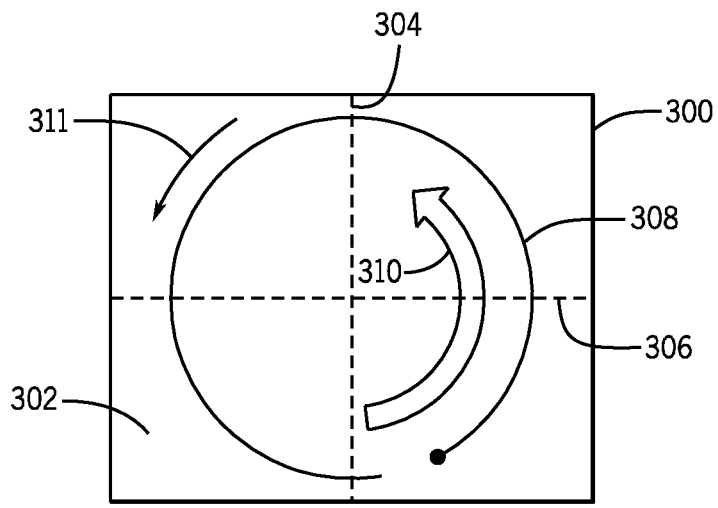
FIG. 3A is a plot illustrating an embodiment of the data received by the monitoring system of FIG. 1 during normal operation of a rotor meant to rotate in counterclockwise direction (viewed from driver to driven equipment)
Figure 3B:
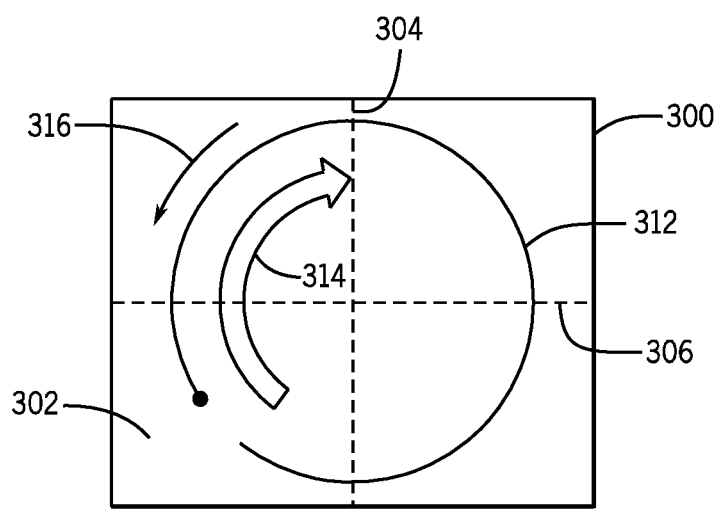
FIG. 3B is a plot illustrating an embodiment of the data received by the monitoring system of FIG. 1 during reverse rotation for the same rotor that is meant to rotate in counter clockwise direction.

FIG. 2A-2C are speed trend plots 202 and FIG. 3A-3B are orbit plots 300 representative of data that may be received by the monitoring system 126 during a shutdown procedure of the steam turbine system 100. As generally discussed above, the monitoring system 126 may generate signals 136 to output data represented by graphs FIG. 2A, 2B, 2C, 3A, or 3B to a workstation or a generated report as further evidence of a reverse rotation. Alternatively, the monitoring system 126 may analyze (e.g., using signal processing) the data internally, as is usually represented in FIG. 2A, 2B, 2C, 3A, or 3B, to determine if a reverse rotation will occur, is in the process of occurring, or has already occurred. Then, the processor 128 may generate a signal 136 indicating that a reverse rotation will occur, is in the process of occurring, or has already occurred.

The speed trend plots of FIGS. 2A, 2B, and 2C show RPM versus time. The RPM may be as low as 10-30 RPM, or it may be several thousand RPM. Many machines are designed to only withstand a certain operational RPM. The sensors 120 may be designed to only monitor the RPM, not the direction, of the shaft.

FIG. 2A is a speed trend plot 202 representative of a typical shutdown operation (e.g., normal operating pattern) of the steam turbine system 100. The time until a rotor 112 or the steam turbine 102 stops moving is known as the coast down time. In a typical shutdown, the coast down time may take several minutes (e.g., up to 30 minutes). As the steam turbine system 100 shuts down, the sensors 120 relay gradually slower speed signals to the monitoring system 126 that reflects the coast down in exponential decay line 204.

FIG. 2B is a speed trend plot 202 representative of data during a reverse rotation event self-contained after a period of time. Such an event may occur, for instance, where the steam turbine system 100 is operating normally except, for example, an improperly timed discharge/shut-off valve. The discharge/shut-off valve may be located downstream of the rotor 112 where steam is given off as exhaust 118. As illustrated in the speed plot 202 of FIG. 2B, the steam turbine 102 does not have a coast down time of several minutes, as in FIG. 2A, but instead may take seconds or noticeably less time. Accordingly, the deceleration line 208 (indicative of shaft 114 rotation speed) in a potential reverse rotation event is much faster (e.g., 2-5 times faster) than the typical shutdown line 204 (e.g., up to 30 minutes). The reversing point 210 reflects the moment the rotor 112 stops rotating in its designed direction and begins rotating in the reverse direction (as measured by the shaft 114 rotating in a reverse direction). The camel hump line 212 reflects when the steam turbine system 100 increases speed running in the reverse direction. The camel hump may reach a max speed in the reverse direction as shown at point 214. The reverse rotations may then begin to slow, as reflected in line 216, to a stop as any back pressure causing the reverse rotation abates.

The camel hump pattern, as illustrated in FIG. 2B, includes multiple speed increases (e.g., line 212) and decreases (e.g., deceleration line 208 and line 216) different from that described in a normal shutdown. The monitoring system 126 may, for instance, receive data from the sensors 120 that the processor 128 determines to be representative of speed changes similar to a speed decrease of the deceleration line 208, the speed increase of line 212, and the speed decrease similar to line 216. The processor 128 may then determine an initial value (e.g., zero/one) by comparing the received data representative of the camel hump pattern to the normal operating pattern described above. If the processor 128 determines that the camel hump pattern has occurred, the initial value may be set to one to indicate true. The processor 128 may then weight (e.g., a percent value) the initial value based on how accurate the camel hump pattern reflects a reverse rotation event. For instance, the camel hump pattern is highly consistent with reverse rotation events. Accordingly, a heavy weight (e.g., 70-95% consistency with reverse rotation) may be combined with the initial value to form a weighted value. The weighted values may then be combined to determine whether a reverse rotation has occurred. As discussed below, another embodiment of detecting the reverse rotation, as represented in FIG. 2B, may include comparing the rate of change of speed to the normal operating rate of change of speed or comparing the shut down time (e.g., the coast down time) to a normal operating shut down time.

FIG. 2C is another speed trend plot 202 during a reverse rotation event of the steam turbine system 100. This may occur, for example, when an identical sister machine (e.g. with a common discharge header 118) is providing constant back pressure and continues to force the steam turbine 100 to rotate in reverse until the matter is noticed (e.g., by a user) and corrections are made, for example, to valves in the process line to eliminate the reverse rotation energy source. As mentioned above, it is important to bear in mind that the steam turbine 100 is used merely as an example, and the underlying principle is that the driven piece of equipment becomes the driver. At the first line 218, the rotor 112 of the steam turbine 102 may be running at its operating RPM. When the steam turbine system 100 shuts off, the speed of the rotor 112 decreases rapidly (e.g. 4-10 times faster than normal) until it reaches the reversing point 210 (e.g., zero speed). The rotor 112 then rapidly accelerates (e.g. in under 30 seconds) in the reverse direction, and the reverse speed line 220 reflects that the reverse rotation may even be faster (in terms of magnitude i.e. rpm value) than the operational RPM and may exceed design limits. For instance, the steam turbine 102 may be designed to run at an operating speed of 13,000 rpm shown at line 218. The steam turbine 102 may reverse and go beyond (e.g. 15,000 rpm) the operating speed as indicated by the data plotted on reverse speed line 220. Accordingly, an over speed condition reached through such pattern (hereafter referred to as "rift valley") suggests that a reverse rotation event has occurred.

In order to detect the over speed condition, as illustrated in FIG. 2C, the processor 128 may determine an initial value by comparing the speed data to normal operating patterns. The normal operating patterns could reflect, for instance, the designed operational RPM of the steam turbine system 100. For instance, if the speed data is greater than the designed operational RPM, the initial value may be one (e.g., true). The processor 128 may then determine a weighted value based on the initial value and a weight. The weight may be, for instance, predetermined based on how accurate the over speed rift valley condition reflects a reverse rotation event. The weighted value can then be combined with other weighted values, such as the camel hump weighted value described above. The combined value allows the processor 128 to determine whether a reverse rotation has occurred.

As previously noted, an additional comparison may be made based on the shortened coast down time described above. The coast down time of the steam turbine 102, as illustrated in FIGS. 2B and 2C, is drastically reduced prior to the occurrence of a reverse rotation event. Thus, the processor 128 may calculate the slope that the rpm changes with respect to time. If the speed of the rotor 112 is decreasing at a rate faster than normal operating patterns, it suggests that a reverse rotation event is imminent. Accordingly, the processor 128 will determine that a reverse rotation event has occurred and assign an initial value (e.g., one/zero) indicating as such. Similarly, if the time between two points during shutdown events suggests a faster decay compared to normal operating patterns, the processor 128 can assign an initial value indicating that the decay was different from normal operating patterns. Similar to above, these initial values can be weighted and combined as the processor 128 determines whether a reverse rotation has occurred. In addition to speed data received from the sensors 120, vibration data may be used to determine the occurrence of a reverse rotation event. One way of visually analyzing vibration data is with an orbit plot.

Orbit plots show the vibration precession as the shaft 114 rotates as monitored by the sensors 120. As described above, the processor 126 may simply analyze the vibration and speed data to determine that a reverse rotation will occur, is in the process of occurring, or has already occurred, and generate a signal 136 indicating as such. In the alternative, the processor 128 may output data similar to FIGS. 3A and 3B to a display 302 or a generated report as further evidence (confidence) of a reverse rotation event.

FIG. 3A is a filtered 1X orbit plot 300 illustrating an embodiment of the data received by the monitoring system 126 during normal operation of a rotating machine meant to operate in the counter clockwise direction. A display 302 may be an internal display 134 or it may be a remote display 302 on a workstation on the network. Bear in mind, FIGS. 3A and 3B have a display 302 for illustrative purposes, however, the monitoring system 126 may determine vibration precession internally (e.g., hardware) with signal processing using the processor 128 and do not necessarily need a display 302. The display 302 has a vertical Y axis 304 and a horizontal X axis 306 which is representative of data received from the sensors 120 on the shaft 114 in the Y direction and X direction of the three dimensional coordinate system 124 respectively. Note that the horizontal X axis is approximately (e.g., less than 20 degrees different from) 90 degrees clockwise of the Y axis. The plot 300 is filtered at one times the shaft 114 rotational speed to compensate for problems with the shaft 114 surface, such as scratches. The orbit plot 300 tracks the precession of vibration with a line 308. The direction of normal rotation 311 is shown in the top left to be counter clockwise. In general, the direction of precession of most vibration signals follow the direction of rotation. For instance, a shaft 114 designed to rotate in the counter clockwise direction would most commonly have vibration signals in the counter clockwise direction. FIG. 3A illustrates forward precession of vibration in the counter clockwise direction of such a shaft 114 as indicated by an arrow 310.

FIG. 3B is a similar plot 300 illustrating precession of vibration in the opposite direction (e.g., reverse rotation) of the designed shaft 114 rotation. FIG. 3B shows a line 312 going in the opposite direction of the line 308 in FIG. 3A as further indicated by an arrow 314. The direction of normal rotation 316 is still in the counter clockwise direction, however, the precession of vibration is indicated by the arrow 314 to be in the clockwise direction. This reverse precession of vibration from the normally forward precession is highly indicative of a reverse rotation event when coupled with the existence of the "camel hump" or "rift valley" speed trend patterns. The rotor is actually vibrating in the forward precession (vibration precession same as rotating direction) since the vibration is actually in the same direction of rotation, but the rotation is reverse from the normal rotation direction. Thus, it is described as a reverse precession of vibration. Additionally, reverse rotation sometimes causes rubbing in the bearings or seals as the shaft 114 moves to an abnormal position when the rotor 114 crosses the zero speed. The zero speed is the point at which the rotor 112 stops moving forward and begins to rotate in the reverse direction. The rubbing may produce harmonics and sub harmonics.

The orbit plots 300, as illustrated in FIGS. 3A and 3B, are indicative of vibration data received by the monitoring system 126 from the sensors 120. Similar to the speed data, the processor 128 may compare the vibration data received from the sensors 120 with normal operating patterns. As described above, the comparisons may, for example, be written in code and stored in the memory 130. The normal operating patterns and vibration data may be a representation of the phase relationship between the X sensor and the Y sensor. For instance, the phase relationship may establish an initial condition corresponding to the X sensor leading the Y sensor in phase by approximately 90 degrees. If rotation reverses, the phase relationship may correspond to the Y sensor leading the X sensor in phase by approximately 90 degrees. The comparison of the normal operating patterns and the vibration data may result in an initial value (e.g. zero/one). The initial value may be assigned a weight based on how accurate the reverse precession of vibration data reflects a reverse rotation event. The weighted value can then be combined with other weighted values, such as the speed weighted values described above. If the combined value is above a preset threshold value (e.g., the probability and severity of a reverse rotation occurrence is above the preset threshold value), the processor 128 may have determined that a reverse rotation has occurred.

As will be appreciated, data used to generate the speed trend plot of FIGS. 2A, 2B, and 2C and/or the orbit plot of FIGS. 3A and 3B are not the only means of displaying speed and vibration data. For example, data used to generate a spectrum waterfall plot may also be used to display the reversal of 1X positive (forward precession) and negative (reverse precession) components.

Figure 4:
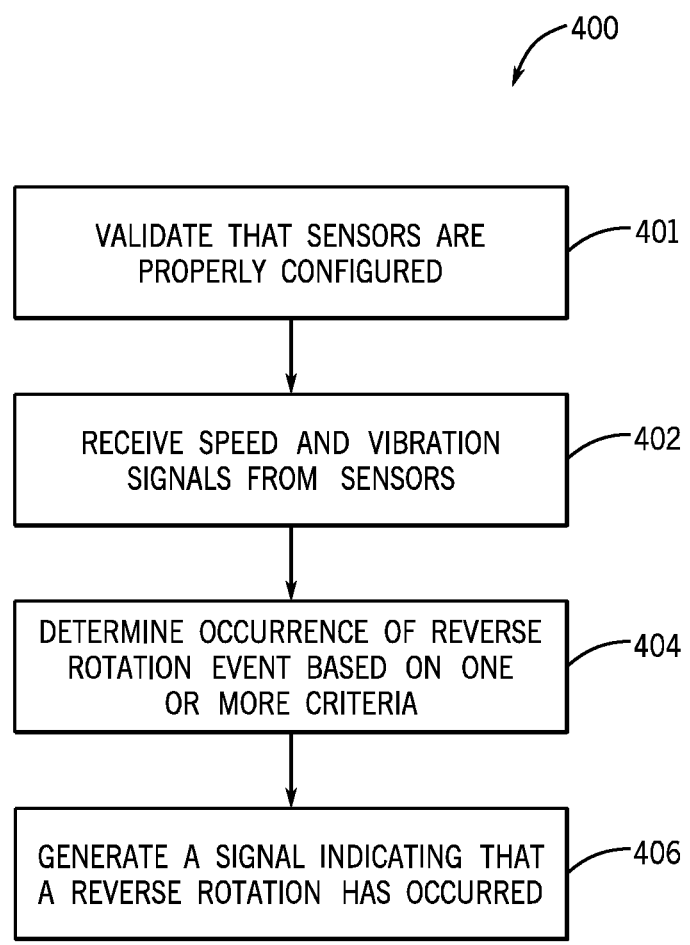
FIG. 4 is a flow diagram of an exemplary method in accordance with the present techniques.

Turning now to FIG. 4, a flow diagram is presented, illustrating an embodiment of a process useful in a rotor reverse rotation event monitoring system 126. The process 400 may include code or instructions stored in a non-transitory computer-readable medium (e.g., the memory 130) and executed, for example, by the one or more processors 128 included in the reverse rotation monitoring system 126. The process 400 may begin with a validation (block 401) that the sensors 120 are properly configured. The validation (block 401) may include, for instance, the processor 128 validating that the sensors 120 are wired correctly and all the vibration signals are reporting forward precession vibration. The validation (block 401) establishes an initial condition validating that all is properly configured. If the sensors are improperly configured (e.g., X & Y sensors wired incorrectly as Y&X), false reverse rotation detection may occur. Next, the processor 128 may receive (block 402) speed and vibration signals from the sensors 120. The speed signals may indicate that the steam turbine system 100 speed is increasing, decreasing, constant, or stopped. The vibration signals may indicate a precession of vibration, harmonics, and sub harmonics of the steam turbine system 100. The speed and vibration signals may be used to determine that the steam turbine system 100 is shutting down. In the alternative, an indication that the steam turbine system 100 is shutting down may be received on the inputs and outputs of the communication interface 132 from the sensors 120, the turbine 112, the shaft 114, or from wired or wireless transmission on the network.

The process 400 may then continue with the processor 128 determining (block 404) that a reverse rotation event will likely occur or has occurred based on the speed and vibration data. That is, the determination of an occurrence of reverse rotation may include a determination of the likelihood of a future occurrence of a reverse rotation event and/or the recognition of a reverse rotation event having occurred. This determination includes any combination of, for instance, the three speed comparisons and the two vibration comparisons described above. Each of the comparisons result in an initial value. The initial values are given weights (e.g., weighted multipliers) resulting in a weighted value. The weights may be based on the severity and confidence that a reverse rotation has occurred. For instance, the weights may be above (e.g., 1.5, 2, or 3) a medium value (e.g., one) if the comparisons reflect a strong correlation to reverse rotation events. The weights may be below the medium value (e.g., 0.5 or 0.75) if the comparisons have a weak correlation to reverse rotation events. The weighted values are combined to reflect the likelihood that a reverse rotation event has occurred. If this combined value (e.g., likelihood) is above a preset threshold value, the processor 128 determines that a reverse rotation event has occurred, and a signal 136 is generated (block 406) indicating that a reverse rotation has occurred.

Technical effects of the present application include providing an alert signal and displaying data to a user. Additionally, interaction with a monitoring system may allow for user interaction to adjust the weights, normal operating patterns, and threshold for detecting reverse rotation. In this manner, precise settings for an individual rotating machine may be accomplished. In this way, the monitoring system may be able to alert a plant, a user, or a workstation of the reverse rotation. This may allow for greater protection and/or proactive diagnostics for a rotating machine, thus improving the life span and usefulness of such equipment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A device, comprising:
 a display;
 a communication interface configured to receive a signal related to a rotational speed, a vibration, or any combination thereof of a rotating machine element from each of a plurality of sensors coupled to the rotating machine element, wherein the plurality of sensors include a first sensor and a second sensor positioned orthogonally with respect to one another;
 a memory for storing an operating pattern of the rotating machine element, wherein the operating pattern is related to the received signal; and
 a processor coupled to the display, the communication interface and the memory, wherein the processor is configured to:
  determine an initial operating condition of the plurality of sensors;
  determine an occurrence of reverse rotation of the rotating machine element by comparing the signal received from the communication interface to the operating pattern stored in the memory;
  generate a reverse rotation event signal indicative of the occurrence of the reverse rotation of the rotating machine element; and
  provide the reverse rotation event signal via the display.

2. The device of claim 1, wherein determining the initial operating condition of the plurality of sensors includes validating that at least two sensors of the plurality of sensors are configured to generate a signal indicative of a forward precession vibration of the rotating machine element.

3. The device of claim 1, wherein the generated reverse rotation event signal includes an alert and reverse rotation event data.

4. The device of claim 3, wherein the reverse rotation event data includes at least one of a speed trend data representation, an orbit data representation, and a cascade data representation.

5. The device of claim 1, wherein the processor is configured to assign an initial value associated with the determined occurrence of reverse rotation, wherein the initial value indicates a difference between the operating pattern stored in the memory and the received signal.

6. The device of claim 1, wherein the memory is configured to store the operating pattern as related to a coast down time, a rate of speed increase or speed decrease, an operational speed, or any combination thereof of the rotating machine element.

7. The device of claim 1, wherein the processor is further configured to provide the reverse rotation event signal in a generated report.

8. A system, comprising:
 a plurality of sensors configured to monitor rotating machinery, each of the plurality of sensors configured to generate a signal based on a physical characteristic of the rotating machinery, wherein the plurality of sensors include a first sensor and a second sensor positioned orthogonally with respect to one another; and a monitoring system comprising a processor, a memory, and a display, the monitoring system configured to:
  receive the signal;
  determine an initial operating condition of the plurality of sensors;
  determine an occurrence of reverse rotation of the rotating machinery by comparing the signal to an operating pattern of the rotating machinery to generate an initial value;
  generate a reverse rotation event signal indicative of the occurrence of a reverse rotation of the rotating machinery; and
  provide the reverse rotation event signal.

9. The system of claim 8, wherein the processor is configured to assign an initial value associated with the determined occurrence of reverse rotation, wherein the initial value indicated a difference between an operating pattern stored in the memory and the received signal.

10. The system of claim 9, wherein the processor is configured to determine the occurrence of reverse rotation of the rotating machinery by applying predetermined weighting values to the initial value to generate a combined value determine the occurrence of reverse rotation of the rotating machinery by comparing the combined value to a preset threshold.

11. The system of claim 10, wherein the processor is configured to determine the occurrence of reverse rotation of the rotating machinery by comparing the combined value to a preset threshold.

12. The system of claim 8, wherein the processor is configured to determine the occurrence of reverse rotation of the rotating machinery by comparing a phase relationship between a first signal of a first sensor and a second signal of a second sensor to an initial condition, wherein the initial condition comprises the first signal leading the second signal, and wherein the occurrence of reverse rotation comprises the second signal leading the first signal in phase.

13. The system of claim 8, wherein the plurality of sensors are configured to generate a signal based on a rotational speed or a vibration of the rotating machinery.

14. The system of claim 8, wherein the monitoring system is further configured to determine that the rotating machinery is shutting down based on the signal.

15. The system of claim 8, wherein the processor is configured to determine the initial operating condition of the plurality of sensors based on validating that at least two sensors of the plurality of sensors are configured to generate a signal indicative of a false reverse rotation of the rotating machinery.

16. The system of claim 8, wherein the generated reverse rotation event signal includes an alert and reverse rotation event data.

17. The system of claim 8, wherein the reverse rotation event data includes at least one of a speed trend data representation, an orbit data representation, and a cascade data representation.

18. The system of claim 8, wherein the processor is configured to assign an initial value associated with the determined occurrence of reverse rotation, wherein the initial value indicates a difference between the operating pattern stored in the memory and the received signal, wherein the operating pattern stored in the memory represents an expected operating pattern of the rotating machinery.

19. The system of claim 8, wherein the memory is configured to store the operating pattern as an expected operating pattern associated with a coast down time, a rate of speed increase or speed decrease, an operational speed, or any combination thereof of the rotating machinery.

20. The system of claim 8, wherein the reverse rotation event signal is provided via the display of the monitoring system.

21. The system of claim 8, wherein the reverse rotation is provided in a report generated by the monitoring system.

22. The system of claim 8, wherein the monitoring system is further configured to provide the reverse rotation event signal as an alert to a remote workstation coupled to the monitoring system and/or for display at the remote workstation.

* * * * *